(12) United States Patent
Kim et al.

(10) Patent No.: US 9,001,454 B1
(45) Date of Patent: Apr. 7, 2015

(54) DISK DRIVE ADJUSTING PHASE OF ADAPTIVE FEED-FORWARD CONTROLLER WHEN RECONFIGURING SERVO LOOP

(71) Applicant: Western Digital Technologies, Inc., Irvine, CA (US)

(72) Inventors: Young-Hoon Kim, Cupertino, CA (US); Wei Xi, Mission Viejo, CA (US)

( * ) Notice: Subject to any disclaimer, the term of this patent is extended or adjusted under 35 U.S.C. 154(b) by 0 days.

(21) Appl. No.: 13/862,320

(22) Filed: Apr. 12, 2013

(51) Int. Cl.
*G11B 5/596* (2006.01)
*G11B 21/10* (2006.01)

(52) U.S. Cl.
CPC .................................. *G11B 21/106* (2013.01)

(58) Field of Classification Search
None
See application file for complete search history.

(56) References Cited

U.S. PATENT DOCUMENTS

| | | | |
|---|---|---|---|
| 5,550,685 A * | 8/1996 | Drouin | 360/77.08 |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,718 B1 | 11/2001 | Bouwkamp et al. | |
| 6,342,984 B1 | 1/2002 | Hussein et al. | |
| 6,347,018 B1 | 2/2002 | Kadlec et al. | |
| 6,369,972 B1 | 4/2002 | Codilian et al. | |
| 6,369,974 B1 | 4/2002 | Asgari et al. | |
| 6,462,896 B1 | 10/2002 | Codilian et al. | |
| 6,476,996 B1 | 11/2002 | Ryan | |

(Continued)

OTHER PUBLICATIONS

Regalli, P.A, Mitra, S.K., Vaidyanathan, P.P., "The digital all-pass filter: a versatile signal processing building block", Proceedings of the IEEE, Jan. 1988, vol. 76, Issue:1, pp. 19-37.
Rajan S., Sichun Wang, Inkol, R., Joyal, A., "Efficient approximation for the arctangent function", Signal Processing Magazine, IEEE, May 2006, vol. 23, Issue: 3, pp. 108-111.

*Primary Examiner* — Andrew L Sniezek

(57) ABSTRACT

A disk drive is disclosed comprising a disk comprising tracks defined by servo sectors, a head, and control circuitry comprising a servo control system operable to actuate the head over the disk in response to the servo sectors. The servo control system is configured into a first state, and a position error signal (PES) representing a difference between a target location for the head and a measured location for the head is generated. An actuator control signal is generated in response to the PES, a feed-forward control signal is adapted in response to the servo sectors, and the actuator control signal is adjusted using the feed-forward control signal. The servo control system is configured from the first state to a second state, and a phase of the adaptation of the feed-forward control signal is adjusted based on the second state.

26 Claims, 5 Drawing Sheets

(56) References Cited

U.S. PATENT DOCUMENTS

| | | |
|---|---|---|
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,158,334 B2 | 1/2007 | Iwashiro |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,319,570 B2 | 1/2008 | Jia et al. |
| 7,330,019 B1 | 2/2008 | Bennett et al. |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |
| 7,466,509 B1 | 12/2008 | Chen et al. |
| 7,468,855 B1 | 12/2008 | Weerasooriya et al. |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |

(56) References Cited

U.S. PATENT DOCUMENTS

| | | |
|---|---|---|
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 8,760,796 B1 | 6/2014 | Lou et al. |
| 8,767,332 B1 | 7/2014 | Chahwan et al. |
| 8,767,343 B1 | 7/2014 | Helmick et al. |
| 8,767,354 B1 | 7/2014 | Ferris et al. |
| 8,773,787 B1 | 7/2014 | Beker |
| 8,779,574 B1 | 7/2014 | Agness et al. |
| 8,780,473 B1 | 7/2014 | Zhao et al. |
| 8,780,477 B1 | 7/2014 | Guo et al. |
| 8,780,479 B1 | 7/2014 | Helmick et al. |
| 8,780,489 B1 | 7/2014 | Gayaka et al. |
| 8,792,202 B1 | 7/2014 | Wan et al. |
| 8,797,664 B1 | 8/2014 | Guo et al. |
| 8,804,267 B2 | 8/2014 | Huang et al. |
| 8,824,081 B1 | 9/2014 | Guo et al. |
| 8,824,262 B1 | 9/2014 | Liu et al. |
| 2004/0213100 A1 | 10/2004 | Iwashiro |
| 2005/0096793 A1 | 5/2005 | Takeuchi |
| 2007/0064334 A1 | 3/2007 | Jia et al. |
| 2007/0189375 A1* | 8/2007 | Kisaka .......................... 375/232 |
| 2010/0035085 A1 | 2/2010 | Jung et al. |
| 2012/0284493 A1 | 11/2012 | Lou et al. |
| 2013/0003219 A1* | 1/2013 | Derosa et al. ................... 360/75 |
| 2013/0120870 A1 | 5/2013 | Zhou et al. |
| 2013/0148240 A1 | 6/2013 | Ferris et al. |

\* cited by examiner

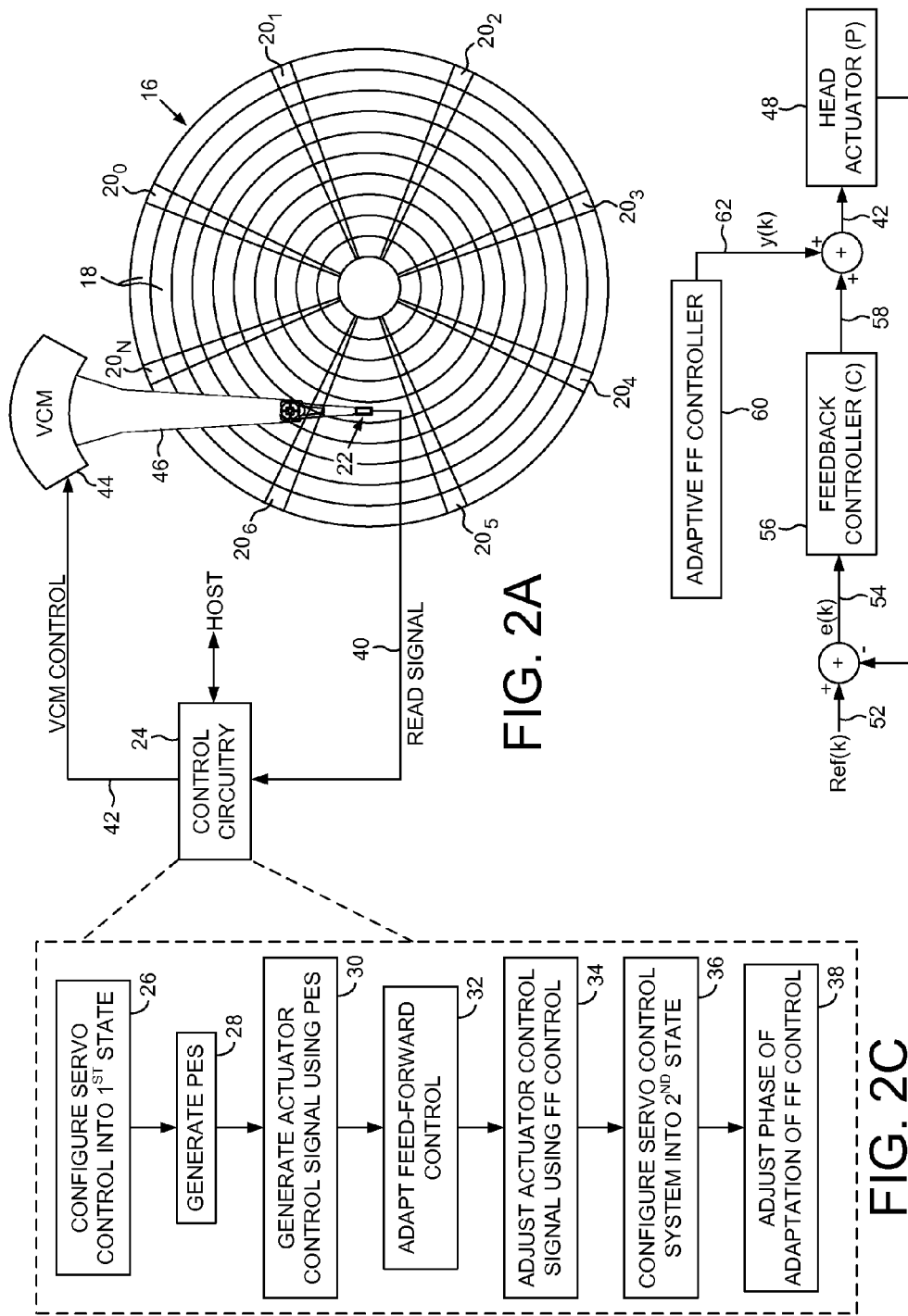

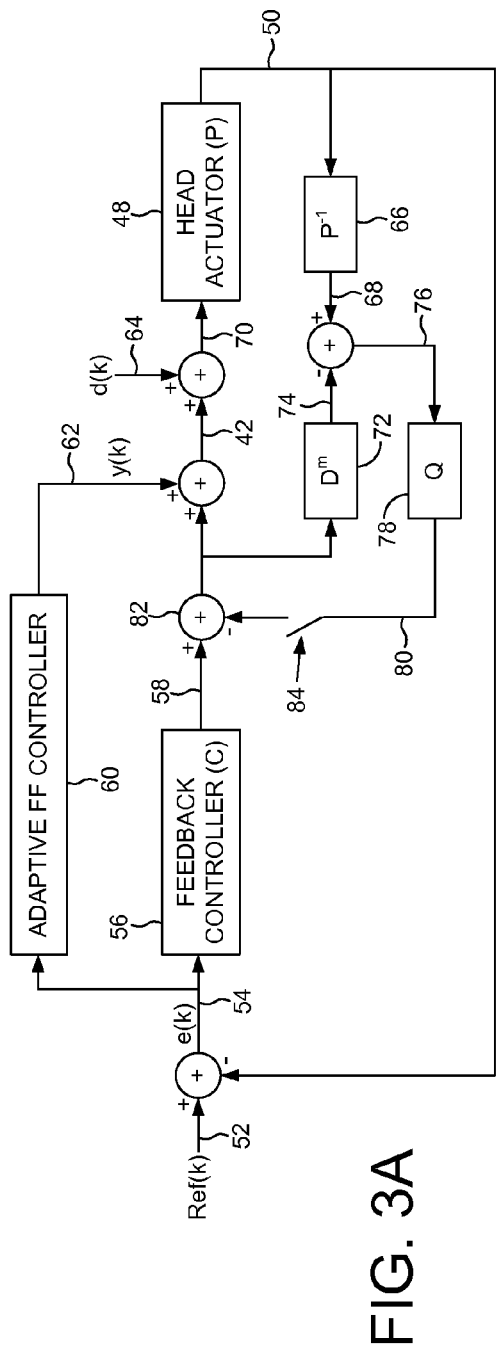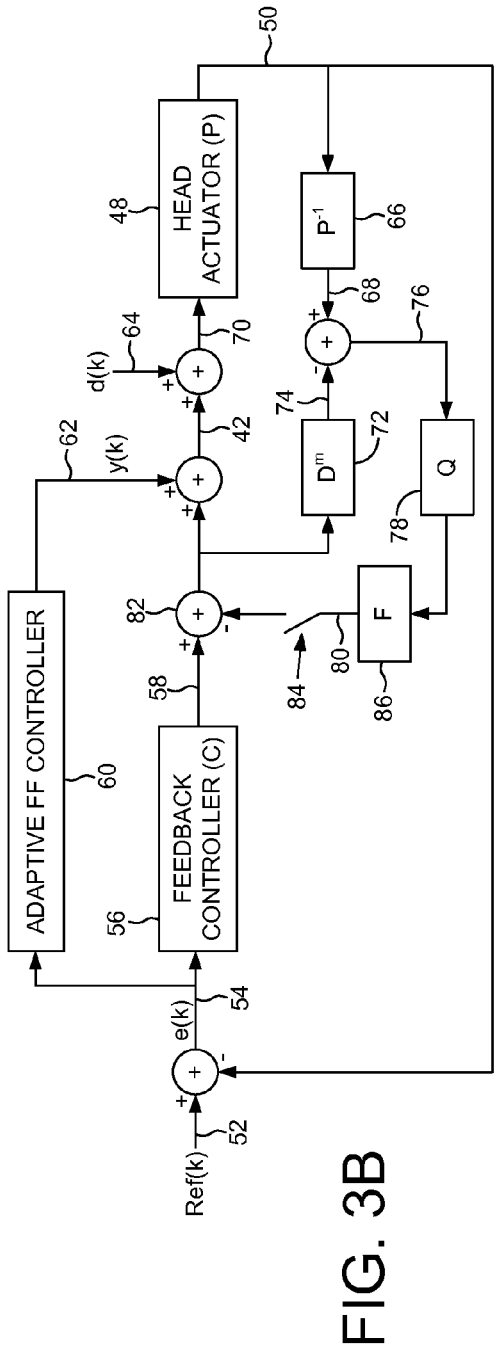
FIG. 3A
FIG. 3B $$\varphi_{i,0} = \angle S_0(e^{j\omega_i})$$
$$S_1 = S_0(1 - Q)$$
$$\psi_i = \angle(1 - Q(e^{j\omega_i})) = \arctan\frac{g \cdot X_R^i X_I^i}{(1 - g) \cdot |X_R^i|^2 + |X_I^i|^2}$$
$$X_R^i = (1 - b_2) \cdot \sin\omega_i \; ; \; X_I^i = b_1 + b_2 \cdot \cos\omega_i$$

DISK DRIVE ADJUSTING PHASE OF ADAPTIVE FEED-FORWARD CONTROLLER WHEN RECONFIGURING SERVO LOOP

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 6, further comprises groups of servo bursts 14 (e.g., N and Q servo bursts), which are recorded with a predetermined phase relative to one another and relative to the servo track centerlines. The phased based servo bursts 14 provide fine head position information used for centerline tracking while accessing a data track during write/read operations.

BRIEF DESCRIPTION OF THE DRAWINGS

FIG. 2A shows a disk drive according to an embodiment comprising a head actuated over a disk by a servo control system.

FIG. 2B shows an embodiment of a servo control system comprising adaptive feed-forward control.

FIG. 2C is a flow diagram according to an embodiment wherein when the servo control system is configured into a different state, a phase of the adaptation of the feed-forward control signal is adjusted.

FIGS. 3A and 3B show an embodiment of a servo control system comprising a disturbance compensator that is enabled/disabled.

DETAILED DESCRIPTION

Figure 1:
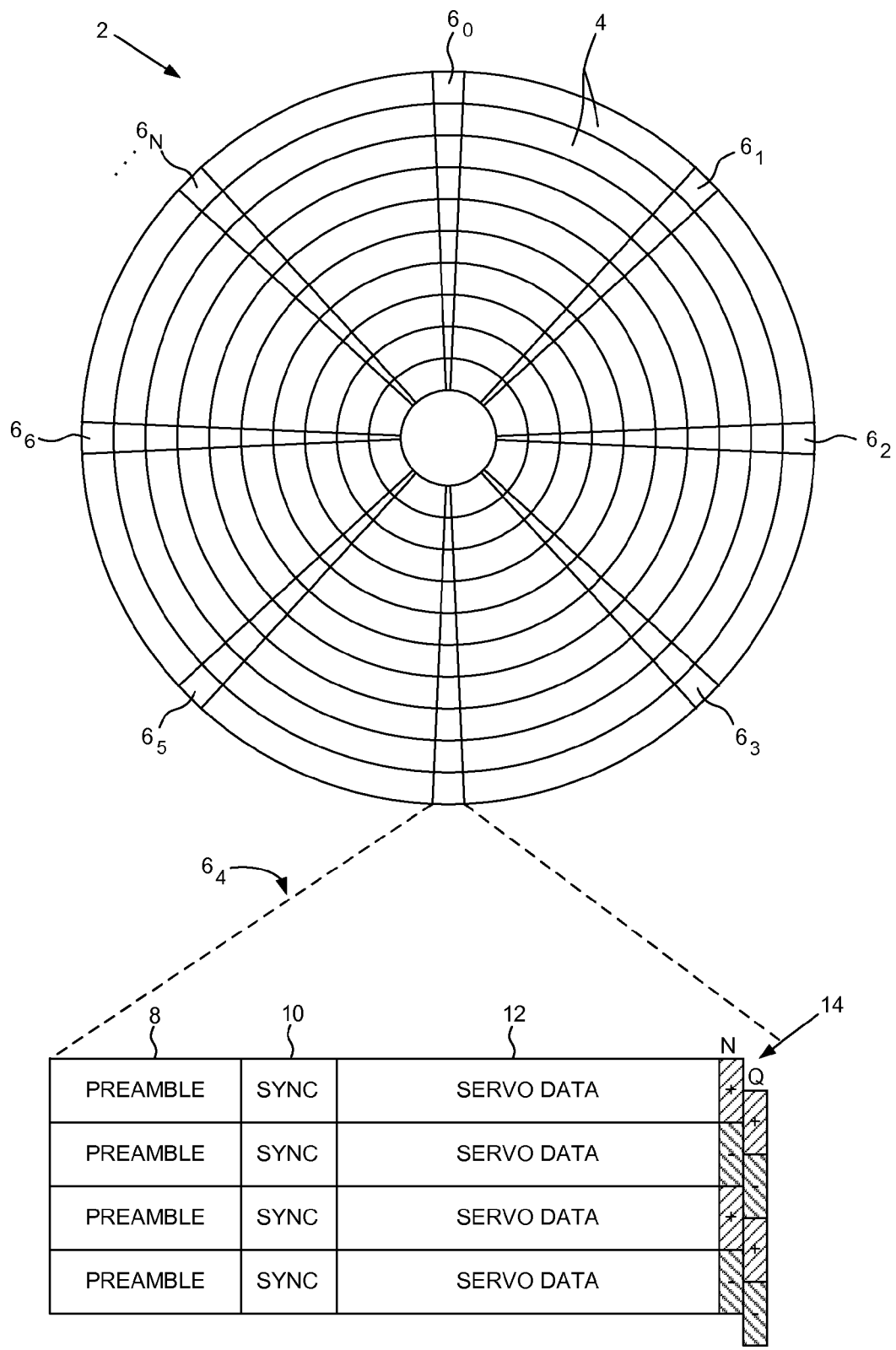
FIG. 1 shows a prior art disk format comprising a plurality of servo tracks defined by embedded servo sectors.

FIG. 2A shows a disk drive comprising a disk 16 comprising tracks 18 defined by servo sectors $20_0$-$20_N$, a head 22, and control circuitry 24 comprising a servo control system (FIG. 2B) operable to actuate the head 22 over the disk 16 in response to the servo sectors $20_0$-$20_N$. The control circuitry 24 is operable to execute the flow diagram of FIG. 2C, wherein the servo control system is configured into a first state (block 26), and a position error signal (PES) representing a difference between a target location for the head and a measured location for the head is generated (block 28). An actuator control signal is generated in response to the PES (block 30), a feed-forward control signal is adapted in response to the servo sectors (block 32), and the actuator control signal is adjusted using the feed-forward control signal (block 34). The servo control system is configured from the first state to a second state (block 36), and a phase of the adaptation of the feed-forward control signal is adjusted based on the second state (block 38).

In the embodiment of FIG. 2A, the control circuitry 24 processes a read signal 40 emanating from the head 22 to demodulate the servo sectors $20_0$-$20_N$ and generate a position error signal (PES) representing an error between the actual position of the head and a target position relative to a target track. The servo control system in the control circuitry 24 filters the PES using a suitable compensation filter to generate a control signal 42 applied to a voice coil motor (VCM) 44 which rotates an actuator arm 46 about a pivot in order to actuate the head 22 radially over the disk 16 in a direction that reduces the PES. The servo sectors $20_0$-$20_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

The servo control system in the embodiment of FIG. 2B comprises a head actuator (P) 48 which may include the VCM 44 shown in FIG. 2A. In other embodiment, the head actuator (P) 48 may comprise a different type of actuator, and/or a secondary microactuator (e.g., a piezoelectric actuator) for actuating the head 22 in fine movements over the disk 16. The secondary microactuator may actuate a suspension relative the actuator arm 46, or actuate a head gimbal assembly relative to the suspension, or any other suitable configuration.

In one embodiment, the position 50 of the head 22 relative to the disk 16 is measured by reading the servo sectors $20_0$-$20_N$. The measured position 50 is subtracted from a reference position 52 to generate the PES 54. A feedback controller (C) 56 processes the PES 54 to generate a feedback control signal 58. An adaptive feed-forward controller 60 generates a feed-forward control signal 62 used to adjust the feedback control signal 58 to generate the actuator control signal 42.

The feed-forward control signal 62 may be adapted in any suitable manner, and in one embodiment it may be adapted based on reading the servo sectors. In addition, the feed-forward control signal 62 may compensate for any disturbance injected into the servo control system, and in one embodiment the feed-forward control signal 62 comprises a sinusoidal signal that compensates for a repeatable disturbance, such as a repeatable runout (RRO) of the servo sectors. In one embodiment, the feed-forward control signal 62 compensates for a fundamental frequency of the RRO and/or one or more harmonics of the RRO. The feed-forward compensation signal 62 may be adapted while the servo control system is configured into a first state, and when the servo control system is configured into a second state, a phase of the adaptation of the feed-forward control signal may be adjusted to compensate for the different configuration.

FIGS. 3A and 3B show an embodiment wherein the servo control system may comprise a disturbance compensator that compensates for a disturbance d(k) 64 affecting the disk drive, such as an external acoustic vibration. In the embodiment of FIG. 3A, the disturbance d(k) 64 is modeled as being added to the actuator control signal 42. Accordingly, the disturbance compensator may comprises a disturbance observer including a filter $P^{-1}$ 66 having an inverse transfer function of the head actuator 48 which generates an inverse signal 68 based on the output 50 of the head actuator 48 (the measured head position). The inverse signal 68 therefore represents the input 70 to the head actuator 48, including the effect of the disturbance d(k) 64. The feedback control signal 58 is delayed 72 by m sample periods $T_s$ ($z^{-m}$) to account for the phase delay of the head actuator 48, and the delayed signal 74 is subtracted from the inverse signal 68. The resulting difference signal 76 is filtered by a Q filter 78 (e.g., a band-pass filter) having a target center frequency $\omega_0$, bandwidth, and gain corresponding to the expected frequency of the disturbance signal d(k) 64. The output 80 of the Q filter 78 represents an estimate of the disturbance $d_{est}$(k-m) 64 which is subtracted from the disturbance d(k) 64 at adder 82 to thereby cancel the effect of the disturbance d(k) 64 on the head actuator 48.

In one embodiment, the feed-forward controller 60 may adapt the feed-forward control signal 62 while the disturbance compensator of FIG. 3A is disabled (while switch 84 is open). In the embodiment wherein the feed-forward controller 60 compensates for the RRO of the servo sectors, the feed-forward control signal 62 may be generated as a sinusoidal signal:

$$y(k) = A_i(k)\cos(\omega_i k) + B_i(k)\sin(\omega_i k)$$

where $A_i$ and $B_i$ are coefficients corresponding to the $i^{th}$ harmonic of the RRO at frequency $\omega_i$. The $A_i$ and $B_i$ coefficients may be adapted according to:

$$A_i(k+1) = A_i(k) + \gamma_i \cos(\omega_i k - \omega_i) e(k)$$

$$B_i(k+1) = B_i(k) + \gamma_i \sin(\omega_i k - \omega_i) e(k)$$

where $\gamma_i$ is a learning coefficient, e(k) represents the PES 54 in FIG. 3A, and $\phi_i$ represents an optimal phase of the cosine and sine harmonic regressors used to adapt the coefficients $A_i$ and $B_i$ of feed-forward control signal 62.

In one embodiment, the optimal phase $\phi_i$ of the cosine and sine harmonic regressors with the disturbance compensator disabled may be determined according to:

$$\angle S_0(e^{j\omega_i})$$

where $S_0(e^{j\omega_i})$ represents a first input sensitivity function of the servo control system when configured into the first state:

$$S_0(e^{j\omega_i}) = \frac{1}{1 + P^{-1}(e^{j\omega_i})C^{-1}(e^{j\omega_i})}$$

When the disturbance compensator is enabled by closing switch 84, the optimal phase $\phi_i$ of the cosine and sine harmonic regressors may be determined according to:

$$\phi_{i,0} + \psi_i$$

where $\phi_{i,0}$ represents the initial optimal phase which is adjusted by a correction phase $\psi_i$ that accounts for the effect of the disturbance compensator. In the embodiment of FIG. 3A, when switch 84 is closed the servo control system has a second sensitivity function of the form:

$$S_1(e^{j\omega_i}) = S_0(e^{j\omega_i})(1 - Q(e^{j\omega_i}))$$

where $S_0(e^{j\omega_i})$ represents the first sensitivity function of the servo control system when switch 84 is open. In this embodiment, the above correction phase $\psi_i$ may be determined by:

$$\angle(1 - Q(e^{j\omega_i})).$$

Accordingly, in one embodiment when switch 84 is closed to enable the disturbance compensator, the phase of the adaptation of the feed-forward control signal 62 is adjusted by the correction phase $\psi_i$.

In one embodiment, the Q filter 78 in the embodiment of FIG. 3A comprises:

$$gQ_0(e^{j\omega_i})$$

where g is a gain and $Q_0(e^{j\omega_i})$ is a band-pass filter. In one embodiment, the band-pass filter $Q_0(e^{j\omega_i})$ comprises a lattice-based filter:

$$Q_0(z) = \frac{a_0(z^2 - 1)}{z^2 + b_1 z + b_2}$$

where the above filter coefficients may be calculated according to:

$$a_0 = \frac{1 - k_2}{2}, \quad b_1 = k_1(1 - k_2), \quad b_2 = k_2$$

in which $k_1$ and $k_2$ are determined by the center frequency $F_c$ and the bandwidth B as follows:

$$k_1 = -\cos\omega_c, \quad k_2 = \frac{1 - \tan(\Omega_B/2)}{1 + \tan(\Omega_B/2)}$$

where $\omega_c = 2\pi F_c T_s$ and $\Omega_B = 2\pi B T_s$. The correction phase $\psi_i$ for the above described Q filter when switch 84 is closed may be determined according to:

$$\arctan\frac{g X_R^i X_I^i}{(1-g)|X_R^i|^2 + |X_I^i|^2}$$

where $X_R^i = (1 - b_2)\sin \omega_i$ and $X_I^i = b_1 + b_2 \cos \omega_i$.

Figures 4A, 4B, 4C:
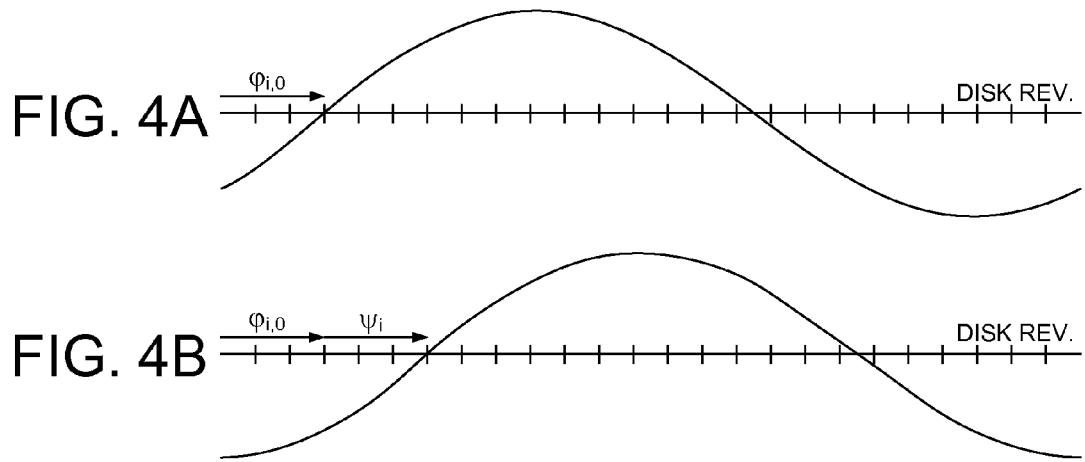
FIGS. 4A and 4B show a harmonic regressor used to adapt the feed-forward control signal, wherein a phase of the harmonic regressor is adjusted when the servo control system is configured into a different state.
FIG. 4C shows an embodiment for adjusting the phase of the adaptation of the feed-forward control signal when a disturbance compensator is enabled in the servo control system.

The above described derivation for computing the correction phase $\psi_i$ is shown in FIG. 4C. FIG. 4A shows an example harmonic regressor used to adapt the feed-forward compensation signal 62 when the switch 84 of FIG. 3A is open (to disable the disturbance compensator). When the switch 84 is closed (to enable the disturbance compensator), the initial phase of the harmonic regressor $\phi_{i,0}$ is adjusted by adding the correction phase $\psi_i$ as shown in FIG. 4B. In the example of FIGS. 4A and 4B, the feed-forward control signal 62 compensates for the fundamental frequency of the RRO, and therefore the frequency $\omega_i$ of the harmonic regressor is the rotation frequency of the disk (the 1× frequency).

FIG. 3B shows an embodiment wherein the disturbance compensator further comprises a filter F 86 which compensates for the effect of the delay 72 when the disturbance d(k) 64 comprises a high frequency. That is, when the disturbance d(k) 64 comprises a high frequency, the delay 72 may induce a mismatch between the target center frequency of the Q filter 78 and the actual center frequency of the Q filter 78. At high frequencies, the inverse filter $P^{-1}(z^{-1})$ 66 may be modeled as $z^{-m}P_n^{-1}(z^{-1})$ and the relationship between the error signal e(k) 54 in FIG. 3B and the disturbance d(k) 64 may be represented as:

$$e(k) = -S_1(z^{-1})P(z^{-1})d(k)$$

where:

$$S_1(z^{-1}) = S_0(z^{-1})(1 - z^{-m}Q(z^{-1})F(z^{-1})).$$

For optimal disturbance cancellation at $\omega_i$, the following equation is minimized:

$$\min: |1 - e^{j\omega_i}Q(e^{j\omega_i})F(e^{j\omega_i})|$$

In one embodiment, the filter F 86 comprises an finite impulse response filter (FIR) of the form:

$$F(z^{-1}) = c_0 + c_1 z^{-1}.$$

When the Q filter 78 comprises the above described lattice-based band-pass filter, the solution that will minimize the above equation is:

$$c_0 = \frac{\sin((m+1)\omega_i)}{\sin(\omega_i)},$$

$$c_1 = \frac{-\sin(m\omega_i)}{\sin(\omega_i)}$$

When employing the filter F 86 at high frequencies the following approximation holds:

$$S_1(e^{j\omega_i}) \approx S_0(e^{j\omega_i})(1 - Q(e^{j\omega_i}))$$

and therefore the derivation of FIG. 4C holds when computing the correction phase $\psi_i$.

Figure 5:
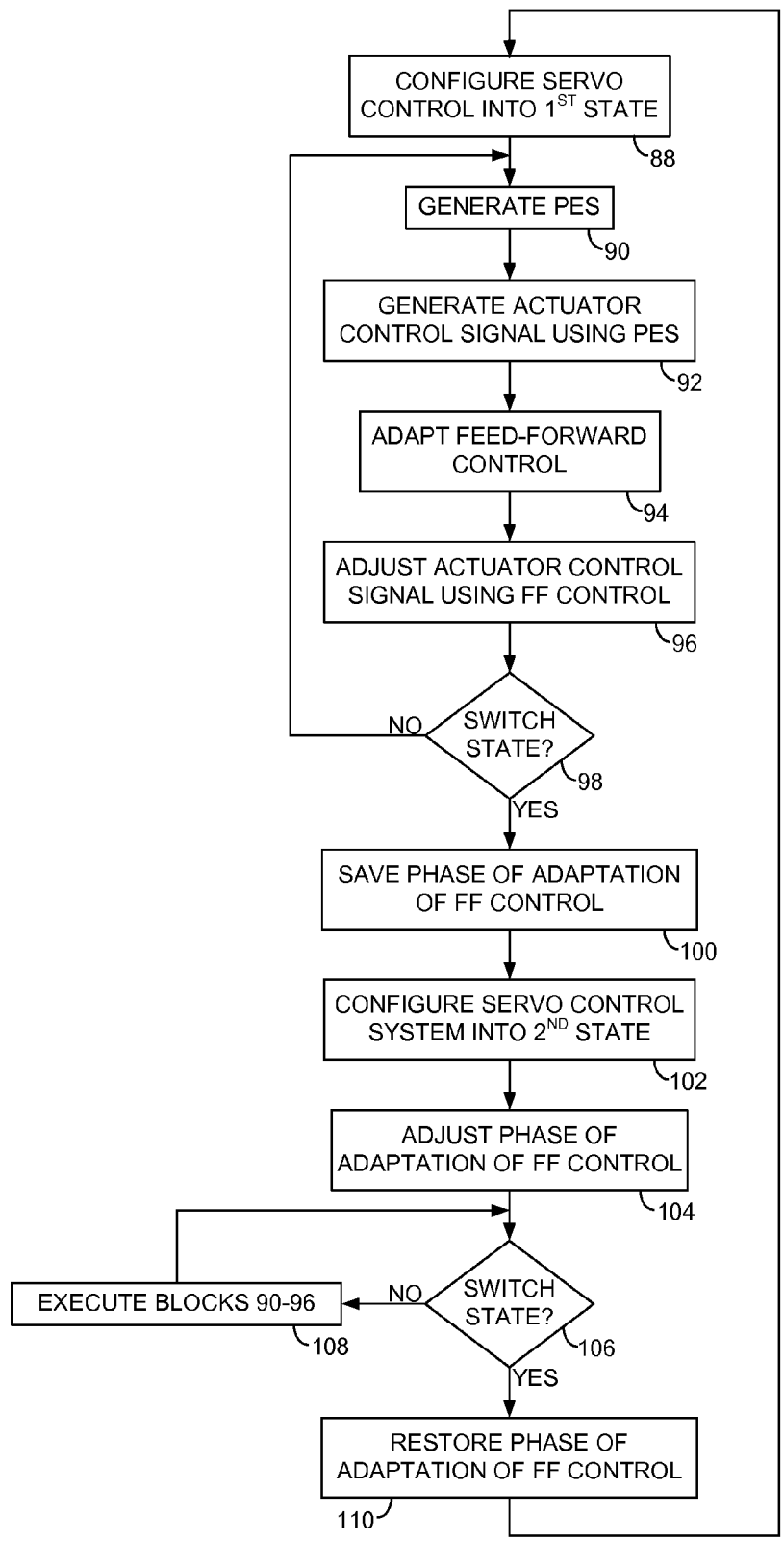
FIG. 5 is a flow diagram according to an embodiment wherein the phase of the adaptation of the feed-forward control signal is saved and restored as the servo control system is configured between a first and second state.

FIG. 5 is a flow diagram according to an embodiment wherein after configuring the servo control system into a first state (block 88), such as opening switch 84 in FIG. 3A, the PES is generated (block 90), and the actuator control signal is generated based on the PES (block 92). The feed-forward control signal is adapted (block 94), and the actuator control signal is adjusted using the feed-forward control signal (block 96). When the servo control system is configured into the second state (block 98), such as closing switch 84 in FIG. 3A, the phase of the adaptation of the feed-forward control (e.g., the phase $\phi_{i,0}$ shown in FIG. 4A) is saved (block 100). The servo control system is configured into the second state (block 102), and the phase of the adaptation of the feed-forward control signal is adjusted by the correction phase $\psi_i$ (block 104). While the servo control system remains in the second state (block 106), blocks 90 to 96 of FIG. 5 are repeated (block 108). When the servo control system switches back to the first state (block 106), the phase saved at block 100 is used to restore the phase of the adaptation of the feed-forward control signal (block 110).

The feed-forward compensation signal 62 may be generated using any suitable algorithm other than the harmonic regressor algorithm described above. For example, in one embodiment the harmonic regressor algorithm described above may be transformed into an equivalent infinite impulse response (IIR) filter of the form:

$$\frac{\cos(\omega_i - \varphi_i) - \cos(\varphi_i)}{z^2 - 2z\cos\omega_i + 1}$$

Accordingly, in this embodiment adjusting the phase of the adaptation of the feed-forward control signal means adjusting the zero of the above transfer function representing the IIR filter.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
a disk comprising tracks defined by servo sectors;
a head; and
control circuitry comprising a servo control system operable to actuate the head over the disk in response to the servo sectors, the control circuitry operable to:
configure the servo control system into a first state so as to comprise a first input sensitivity function;
generate a position error signal (PES) representing a difference between a target location for the head and a measured location for the head;
generate an actuator control signal in response to the PES;
adapt a feed-forward control signal in response to the servo sectors;
adjust the actuator control signal using the feed-forward control signal;
configure the servo control system from the first state to a second state so as to comprise a second input sensitivity function different from the first input sensitivity function; and
adjust a phase of the adaptation of the feed-forward control signal based on the second state.

2. The disk drive as recited in claim 1, wherein the feed-forward control signal comprises a sinusoidal control signal.

3. The disk drive as recited in claim 2, wherein the feed-forward control signal compensates for a repeatable runout (RRO) of the servo sectors.

4. The disk drive as recited in claim 3, wherein the feed-forward control signal compensates for a harmonic of the repeatable runout (RRO).

5. The disk drive as recited in claim 2, wherein the control circuitry is further operable to initialize the phase of the adaptation of the feed-forward control signal based on a first phase response of the first input sensitivity function of the servo control system when configured into the first state.

6. The disk drive as recited in claim 5, wherein the control circuitry is further operable to adjust the phase of the adaptation of the feed-forward control signal based on a second phase response of the second input sensitivity function of the servo control system when configured into the second state.

7. The disk drive as recited in claim 1, wherein the control circuitry is further operable to:
prior to configuring the servo control system into the second state, save the phase of the adaptation of the feed-forward control signal;
configure the servo control system from the second state to the first state; and
restore the phase of the adaptation of the feed-forward control signal based on the saved phase.

8. The disk drive as recited in claim 7, wherein the control circuitry is further operable to:
configure the servo control system into the second state by enabling a disturbance compensator; and
configure the servo control system into the first state by disabling the disturbance compensator.

9. The disk drive as recited in claim 8, wherein the disturbance compensator comprises a disturbance observer operable to adjust the actuator control signal based on an observed disturbance.

10. The disk drive as recited in claim 9, wherein the control circuitry is further operable to adjust the phase of the adaptation of the feed-forward control signal based on the phase response of:

$$1 - Q(e^{j\omega_i})$$

where:
Q represents a disturbance observer filter; and
$\omega_i$ represents a target frequency of the observed disturbance.

11. The disk drive as recited in claim 10, wherein the control circuitry is further operable to adjust the phase of the adaptation of the feed-forward control signal based on:

$$\arctan \frac{g X_R^i X_I^i}{(1-g)|X_R^i|^2 + |X_I^i|^2}$$

where:
$X_R^i = (1-b_2) \sin \omega_i$;

$X_I^i = b_1 + b_2 \cos \omega_i$;

g represents a gain of the disturbance observer filter; and
$b_1$ and $b_2$ represent coefficients of the disturbance observer filter.

12. The disk drive as recited in claim 11, wherein $b_1$ and $b_2$ establish a center frequency and bandwidth of the disturbance observer filter.

13. A method of operating a disk drive comprising a disk comprising tracks defined by servo sectors, a head, and control circuitry comprising a servo control system operable to actuate the head over the disk in response to the servo sectors, the method comprising:
configuring the servo control system into a first state so as to comprise a first input sensitivity function;
generating a position error signal (PES) representing a difference between a target location for the head and a measured location for the head;
generating an actuator control signal in response to the PES;
adapting a feed-forward control signal in response to the servo sectors;
adjusting the actuator control signal using the feed-forward control signal;
configuring the servo control system from the first state to a second state so as to comprise a second input sensitivity function different from the first input sensitivity function; and
adjusting a phase of the adaptation of the feed-forward control signal based on the second state.

14. The method as recited in claim 13, wherein the feed-forward control signal comprises a sinusoidal control signal.

15. The method as recited in claim 14, wherein the feed-forward control signal compensates for a repeatable runout (RRO) of the servo sectors.

16. The method as recited in claim 15, wherein the feed-forward control signal compensates for a harmonic of the repeatable runout (RRO).

17. The method as recited in claim 14, further comprising initializing the phase of the adaptation of the feed-forward control signal based on a first phase response of the first input sensitivity function of the servo control system when configured into the first state.

18. The method as recited in claim 17, further comprising adjusting the phase of the adaptation of the feed-forward control signal based on a second phase response of the second input sensitivity function of the servo control system when configured into the second state.

19. The method as recited in claim 13, further comprising:
prior to configuring the servo control system into the second state, saving the phase of the adaptation of the feed-forward control signal;

configuring the servo control system from the second state to the first state; and restoring the phase of the adaptation of the feed-forward control signal based on the saved phase.

20. The method as recited in claim 19, further comprising:
configuring the servo control system into the second state by enabling a disturbance compensator; and
configuring the servo control system into the first state by disabling the disturbance compensator.

21. The method as recited in claim 20, wherein the disturbance compensator comprises a disturbance observer operable to adjust the actuator control signal based on an observed disturbance.

22. The method as recited in claim 21, further comprising adjusting the phase of the adaptation of the feed-forward control signal based on the phase response of:

$$1-Q(e^{j\omega_i})$$

where:
Q represents a disturbance observer filter; and
$\omega_i$ represents a target frequency of the observed disturbance.

23. The method as recited in claim 22, further comprising adjusting the phase of the adaptation of the feed-forward control signal based on:

$$\arctan \frac{g X_R^i X_I^i}{(1-g)|X_R^i|^2 + |X_I^i|^2}$$

where:
$X_R^i = (1-b_2)\sin \omega_i$;

$X_I^i = b_1 + b_2 \cos \omega_i$;

g represents a gain of the disturbance observer filter; and
$b_1$ and $b_2$ represent coefficients of the disturbance observer filter.

24. The method as recited in claim 23, wherein $b_1$ and $b_2$ establish a center frequency and bandwidth of the disturbance observer filter.

25. A disk drive comprising:
a disk comprising tracks defined by servo sectors;
a head; and
control circuitry comprising a servo control system operable to actuate the head over the disk in response to the servo sectors, the control circuitry operable to:
configure the servo control system into a first state;
generate a position error signal (PES) representing a difference between a target location for the head and a measured location for the head;
generate an actuator control signal in response to the PES;
adapt a feed-forward control signal in response to the servo sectors;
adjust the actuator control signal using the feed-forward control signal;
configure the servo control system from the first state to a second state;
adjust a phase of the adaptation of the feed-forward control signal based on the second state;
prior to configuring the servo control system into the second state, save the phase of the adaptation of the feed-forward control signal;
configure the servo control system from the second state to the first state; and
restore the phase of the adaptation of the feed-forward control signal based on the saved phase.

26. A method of operating a disk drive comprising a disk comprising tracks defined by servo sectors, a head, and control circuitry comprising a servo control system operable to actuate the head over the disk in response to the servo sectors, the method comprising:
configuring the servo control system into a first state;
generating a position error signal (PES) representing a difference between a target location for the head and a measured location for the head;
generating an actuator control signal in response to the PES;
adapting a feed-forward control signal in response to the servo sectors;
adjusting the actuator control signal using the feed-forward control signal;
configuring the servo control system from the first state to a second state;
adjusting a phase of the adaptation of the feed-forward control signal based on the second state;
prior to configuring the servo control system into the second state, saving the phase of the adaptation of the feed-forward control signal;
configuring the servo control system from the second state to the first state; and
restoring the phase of the adaptation of the feed-forward control signal based on the saved phase.

* * * * *